United States Patent
He et al.

(10) Patent No.: US 12,474,611 B2
(45) Date of Patent: Nov. 18, 2025

(54) ARRAY SUBSTRATE, LIQUID CRYSTAL DISPLAY PANEL HAVING THE ARRAY SUBSTRATE AND LIQUID CRYSTAL DISPLAY APPARATUS HAVING THE LIQUID CRYSTAL DISPLAY PANEL

(71) Applicants: MIANYANG HKC OPTOELECTRONICS TECHNOLOGY CO., LTD., Sichuan (CN); HKC CORPORATION LIMITED, Guangdong (CN)

(72) Inventors: Jing He, Sichuan (CN); Baohong Kang, Sichuan (CN)

(73) Assignees: MIANYANG HKC OPTOELECTRONICS TECHNOLOGY CO., LTD., Mianyang (CN); HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 17/907,825

(22) PCT Filed: Dec. 30, 2021

(86) PCT No.: PCT/CN2021/143353
§ 371 (c)(1),
(2) Date: Aug. 29, 2022

(87) PCT Pub. No.: WO2022/193786
PCT Pub. Date: Sep. 22, 2022

(65) Prior Publication Data
US 2024/0192553 A1    Jun. 13, 2024

(30) Foreign Application Priority Data
Mar. 18, 2021 (CN) .......................... 202110290698.5

(51) Int. Cl.
*G02F 1/1345*    (2006.01)
*G02F 1/1333*    (2006.01)
(Continued)

(52) U.S. Cl.
CPC ...... *G02F 1/1345* (2013.01); *G02F 1/133345* (2013.01); *G02F 1/1339* (2013.01); *H10D 86/441* (2025.01); *H10D 86/60* (2025.01)

(58) Field of Classification Search
CPC .................... G02F 1/1345; G02F 1/133345
See application file for complete search history.

(56) References Cited

U.S. PATENT DOCUMENTS

| 5,949,502 A | 9/1999 | Matsunaga et al. |
| 2013/0168707 A1* | 7/2013 | Huang ................ H01L 27/1244 257/E21.409 |

(Continued)

FOREIGN PATENT DOCUMENTS

| CN | 102623397 A | 8/2012 |
| CN | 102902084 A | 1/2013 |

(Continued)

OTHER PUBLICATIONS

International Search Report issued on Mar. 16, 2022 in corresponding International application No. PCT/CN2021/143353; 5 pages.

(Continued)

*Primary Examiner* — Lauren Nguyen
(74) *Attorney, Agent, or Firm* — Maier & Maier, PLLC

(57) ABSTRACT

An array substrate, an LCD panel and an LCD apparatus are provided, the array substrate includes: a base substrate, a first metal pattern layer and a protection layer stacked in sequence; a display area and a peripheral area surrounding the display area, the peripheral area includes a bonding area and a non-bonding area, and the bonding area is disposed on at least one side outside the display area; where the first (Continued)

FIG. 8 metal pattern layer includes a plurality of conductive contacts disposed in the bonding area and arranged at intervals along a first direction and a plurality of bent signal leads disposed in the non-bonding area, the protection layer includes a first insulation layer and a second metal pattern layer stacked in sequence, and along a thickness direction of the base substrate, the first insulation layer is disposed on a side of the second metal pattern layer approaching the base substrate.

17 Claims, 11 Drawing Sheets

(51) Int. Cl.
  *G02F 1/1339*  (2006.01)
  *H10D 86/40*  (2025.01)
  *H10D 86/60*  (2025.01)

(56) References Cited

U.S. PATENT DOCUMENTS

| | | | | |
|---|---|---|---|---|
| 2014/0218653 | A1* | 8/2014 | Funahashi | G02F 1/13458 |
| | | | | 349/153 |
| 2020/0235190 | A1 | 7/2020 | Kim et al. | |

FOREIGN PATENT DOCUMENTS

| | | | | |
|---|---|---|---|---|
| CN | 203086846 | U | 7/2013 | |
| CN | 104269415 | A | 1/2015 | |
| CN | 104952888 | A | 9/2015 | |
| CN | 107085333 | A | 8/2017 | |
| CN | 108845465 | A | 11/2018 | |
| CN | 109116605 | A | 1/2019 | |
| CN | 109307961 | A | 2/2019 | |
| CN | 109309101 | A | 2/2019 | |
| CN | 110018597 | A | 7/2019 | |
| CN | 110164879 | A | 8/2019 | |
| CN | 110187575 | A | 8/2019 | |
| CN | 110837194 | A | 2/2020 | |
| CN | 110867477 | A | 3/2020 | |
| CN | 210403731 | U | 4/2020 | |
| CN | 21-0986579 | * | 7/2020 | ............... G09F 9/00 |
| CN | 111863903 | A | 10/2020 | |
| CN | 111900174 | A | 11/2020 | |
| CN | 113031357 | A | 6/2021 | |
| JP | 2007287949 | A | 11/2007 | |
| JP | 2008158393 | A | 7/2008 | |
| JP | 2008233727 | A | 10/2008 | |
| JP | 2009036982 | A | 2/2009 | |
| JP | 2012189653 | A | 10/2012 | |
| JP | 2013050472 | A | 3/2013 | |
| KR | 2000-0000533 | A | 1/2000 | |
| KR | 20030042079 | A | 5/2003 | |
| KR | 10-2008-0054620 | A | 6/2008 | |
| KR | 10-2009-0050762 | A | 5/2009 | |
| WO | 2020238063 | A1 | 12/2020 | |

OTHER PUBLICATIONS

Extended Search Report issued on Feb. 27, 2025, in corresponding European Application No. 21912345.2, 6 pages.

Office Action issued on Jun. 1, 2025, in corresponding Indian Application No. 202227041904, 6 pages.

* cited by examiner

ARRAY SUBSTRATE, LIQUID CRYSTAL DISPLAY PANEL HAVING THE ARRAY SUBSTRATE AND LIQUID CRYSTAL DISPLAY APPARATUS HAVING THE LIQUID CRYSTAL DISPLAY PANEL

CROSS-REFERENCE TO RELATED APPLICATIONS

The present application is a national phase of International Application No. PCT/CN2021/143353 filed on Dec. 30, 2021 and claims priority benefits to Chinese Patent Application No. 202110290698.5 filed with the Chinese State Intellectual Property Administration on Mar. 18, 2021 and entitled "ARRAY SUBSTRATE, LIQUID CRYSTAL DISPLAY PANEL AND LIQUID CRYSTAL DISPLAY APPARATUS", the contents all of which are incorporated herein by reference in their entities.

TECHNICAL FIELD

The present application involves in the field of display technologies, and particularly relates to an array substrate, a liquid crystal display panel and a liquid crystal display apparatus.

BACKGROUND

LCD (Liquid Crystal Display) panels have advantages of low radiation, small size and low power consumption etc., and are widely used in various electronic devices such as notebook computers and televisions.

Among them, the LCD panel usually includes an array substrate (i.e. TFT, Thin Film Transistor), a color film substrate (i.e. CF, color filter), an LC (Liquid Crystal) sandwiched between the array substrate and the color film substrate, and a sealant frame, etc.

The array substrate includes a display area and a bonding area disposed outside the display area. Since the array substrate needs to be bonded with various circuits to realize signal transmission, the array substrate is provided with the bonding area thereon, and a plurality of conductive contacts are arranged in the bonding area of the array substrate, where each of the conductive contacts is connected to one signal lead on the array substrate. Then, the conductive contacts of the array substrate are bonded with gold fingers of an external FPC (Flexible Printed Circuit), and an external signal can be transmitted to the inside of the array substrate by using this structure to control a display screen.

However, in the prior art, in order to achieve a narrow frame, routing directions of the signal leads are usually designed to be perpendicular to extending directions of the conductive contacts in the array substrate, in this way, the signal leads and the conductive contacts are connected to form an L-shape bend. If the gold finger occurs an alignment deviation when bonding with the conductive contact and extends to the top of the signal lead connected to other conductive contact after going beyond the bonding area, the gold finger will cause conduction between different signal leads when a protection layer covering the signal leads is crushed, thereby resulting in a short circuit problem.

Therefore, there is an urgent need for an array substrate capable of avoiding the above short circuit problem.

SUMMARY

[1] Embodiments of the present application provide an array substrate, an LCD panel and an LCD apparatus, and adding one layer of second metal pattern layer in the protection layer above bent signal leads can plays a role of protecting the signal leads, so that the short-circuiting problem caused by the gold fingers when the gold fingers are bonded can be avoided.

A first aspect provides an array substrate, which includes: a base substrate, a first metal pattern layer and a protection layer arranged as stacked in sequence: the array substrate further includes: a display area and a peripheral area surrounding the display area, the peripheral area includes a bonding area and a non-bonding area, and the bonding area is disposed on at least one side outside the display area:

the first metal pattern layer includes a plurality of conductive contacts disposed in the bonding area and arranged at intervals along a first direction and a plurality of signal leads disposed in the non-bonding area and having a bent shape, one terminal of each of the conductive contacts approaching the display area is connected with corresponding one of the signal leads, the conductive contacts extend along a second direction and are configured to bond with gold fingers on a circuit board to be bonded, the first direction is parallel to an edge of the display area most approaching the bonding area, and the second direction and the first direction are perpendicular to each other;

the protection layer includes a first insulation layer and a second metal pattern layer arranged as stacked in sequence, and along a thickness direction of the base substrate, the first insulation layer is disposed on a side of the second metal pattern layer approaching the base substrate, here the second metal pattern layer is disposed in the non-bonding area, and the second metal pattern layer at least partially covers the signal leads.

In the array substrate provided by the first aspect, the second metal pattern layer is added in the protection layer above the bent signal leads, so that the second metal pattern layer at least partially covering the signal leads can withstand a certain bonding pressure when the gold fingers are bonded with the conductive contacts, so as to provide protection for the signal leads, thereby the short-circuiting problem caused by the bonding in the prior art can be avoided. Additionally, the second metal pattern layer may also be prepared in the same layer as a source electrode and a drain electrode in a TFT, so that no additional production cost is required.

In a possible implementation of the first aspect, along the thickness direction of the base substrate, a third metal pattern layer disposed in the bonding area is further provided on a side of the protection layer facing away from the base substrate:

the third metal pattern layer is connected to the conductive contacts through through-holes provided in the protection layer, and the third metal pattern layer is configured to connect the conductive contacts with the gold fingers when the conductive contacts are bonded with the gold fingers.

In a possible implementation of the first aspect, each of the signal leads includes a first signal lead sub-portion extending along the second direction and a second signal lead sub-portion extending along the first direction, a first terminal of the first signal lead sub-portion is connected to corresponding one of the conductive contacts, and a second terminal of the first signal lead sub-portion is connected to one terminal of the second signal lead sub-portion; the second metal pattern layer includes a plurality of metal protection lines, and the metal protection lines are disposed on a side of the signal leads facing away from the base substrate. In this implementation, the metal protection lines are disposed on the side of the signal leads facing away from the base substrate, mutual short-circuiting between the signal leads can be avoided.

In a possible implementation of the first aspect, projection of the metal protection lines on the base substrate coincides with projection of the signal leads on the base substrate.

In a possible implementation of the first aspect, projection of the metal protection lines on the base substrate coincides with projection of the second signal lead sub-portions on the base substrate.

In a possible implementation of the first aspect, each of the metal protection lines disposed on a side of the second signal leads facing away from the base substrate includes a plurality of sub-metal protection lines: along the first direction, the length of a second interval region between adjacent two of the sub-metal protection lines is less than or equal to the length of a first internal region between adjacent two of the conductive contacts (21); here, the second interval region corresponding to different second signal lead sub-portions is located between extension lines of two edges of the first interval region parallel to the second direction. In this implementation, after each of the metal protection lines is configured as a structure of multiple sub-metal protection lines, even if the plurality of gold fingers crush the first insulation layer on the same signal lead, the short-circuiting problem can be avoided due to gaps between the sub-metal protection lines.

In a possible implementation of the first aspect, the protection layer further includes: a second insulation layer:
along the thickness direction of the base substrate, the second metal pattern layer is disposed between the first insulation layer and the second insulation layer. In this implementation, when one pair of gold finger and conductive contact are bonded, even if the gold finger crush the second insulation layer above the signal leads, the gold finger will only be connected to the second metal pattern layer, which can be avoid the short-circuiting of the signal lead with other signal leads.

In a possible implementation of the first aspect, the protection layer further includes: a second insulation layer:
along the thickness direction of the base substrate, the second insulation layer is disposed between the first insulation layer and the second metal pattern layer.

A second aspect provides an LCD panel, which includes: an opposite substrate and the array substrate according to the first aspect or any possible implementation of the first aspect, and an LC layer disposed between the opposite substrate and the array substrate.

A third aspect provides an LCD apparatus, which includes: a circuit board to be bonded and the LCD panel according to the second aspect:
the gold fingers are arranged on the circuit board to be bonded, the gold fingers are adapted to a shape of the conductive contacts disposed on the array substrate in the LCD panel, and the gold fingers are configured to bond with the conductive contacts.

Embodiments of the present application provide an array substrate, an LCD panel and an LCD apparatus, the second metal pattern layer is added in the protection layer above the bent signal leads, so that the second metal pattern layer at least partially covering the signal leads can withstand a certain bonding pressure when the gold fingers are bonded with the conductive contacts, so as to provide protection for the signal leads, thereby the short-circuiting problem caused by the bonding in the prior art can be avoided. Additionally, the second metal pattern layer may also be prepared in the same layer as a source electrode and a drain electrode in a TFT, so that no additional production cost is required.

BRIEF DESCRIPTION OF THE DRAWINGS

In order to illustrate the technical solutions of the embodiments of the present application more clearly, the accompanying drawings required to be used in the description for the embodiments will be briefly introduced below, and it is obvious that other drawings may also be obtained according to these drawings for those of ordinary skill in the art without any creative effort.

The realization of purposes, functional characteristics and advantages of the present application will be further described with reference to the accompanying drawings in conjunction with the embodiments.

DETAILED DESCRIPTION

It should be understood that the specific embodiments described herein are only used to explain the present application, but not to limit the present application.

With the development of display technologies, the LCD technology has been widely used in various electronic devices. The electronic devices using the LCD technology for display include an LCD apparatus, and the LCD apparatus usually includes an LCD panel and a driving apparatus configured for driving the LCD panel, and the LCD panel in turn includes an array substrate. An embodiment of the present application provides an array substrate, which is applied to an LCD apparatus in an electronic device.

Among them, the electronic device may be an electronic device from various types, such as a smart phone, a tablet computer, an electronic reader, an in-vehicle computer, a navigator, a digital camera, a smart TV, and a smart wearable device etc. The embodiments of the present application do not impose any limitation on this.

Figure 1:
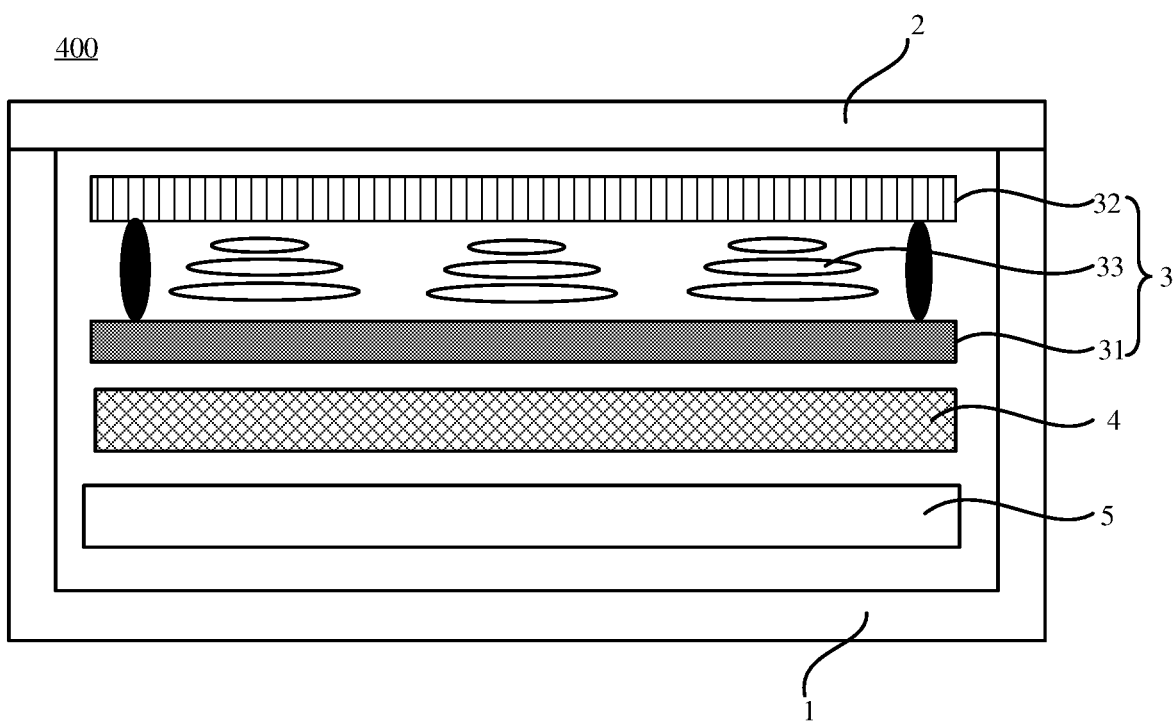
FIG. 1 is a schematic structural diagram of an LCD apparatus.

FIG. 1 shows a schematic structural diagram of an LCD apparatus 400 provided by an embodiment of the present application. As shown in FIG. 1, a main structure of the LCD apparatus 400 includes a frame 1, a cover glass 2, an LCD panel 3, a backlight module 4, a circuit board 5, and other electronic accessories including a camera. Among them, the circuit board 5 is a driving apparatus configured to drive the LCD panel 3, or is a part of the driving apparatus configured to drive the LCD panel 3. Furthermore, the circuit board 5 may be a flexible circuit board.

As shown in FIG. 1, the LCD panel 3 includes an array substrate 31, an opposite substrate 32, an LC layer 33 disposed between the array substrate 31 and the opposite substrate 32, and upper and lower polarization layers. The array substrate 31 and the opposite substrate 32 are assembled together through frame sealant, so that the LC layer 33 is limited in an area surrounded by the frame sealant. Here, when a color filter layer is disposed on the opposite substrate 32, the opposite substrate 32 is a color film substrate.

A longitudinal section of the frame 1 is made U-shaped, the LCD panel 3, the backlight module 4, the circuit board 5 and other electronic accessories including the camera are arranged within the frame 1, the backlight module 4 is disposed below the LCD panel 3, the circuit board 5 is disposed between the backlight module 4 and the frame 1, and the cover plate 2 is disposed on a side of the LCD panel 3 facing away from the backlight module 4.

A path propagation sequence of light in the LCD apparatus 400 of FIG. 1 is as follows: the light is emitted from the backlight module 4, and passes through the array substrate 31, the LC layer 33 and the opposite substrate 32 in the LCD panel 3 in sequence, and then exits the cover plate 2.

Figure 2:
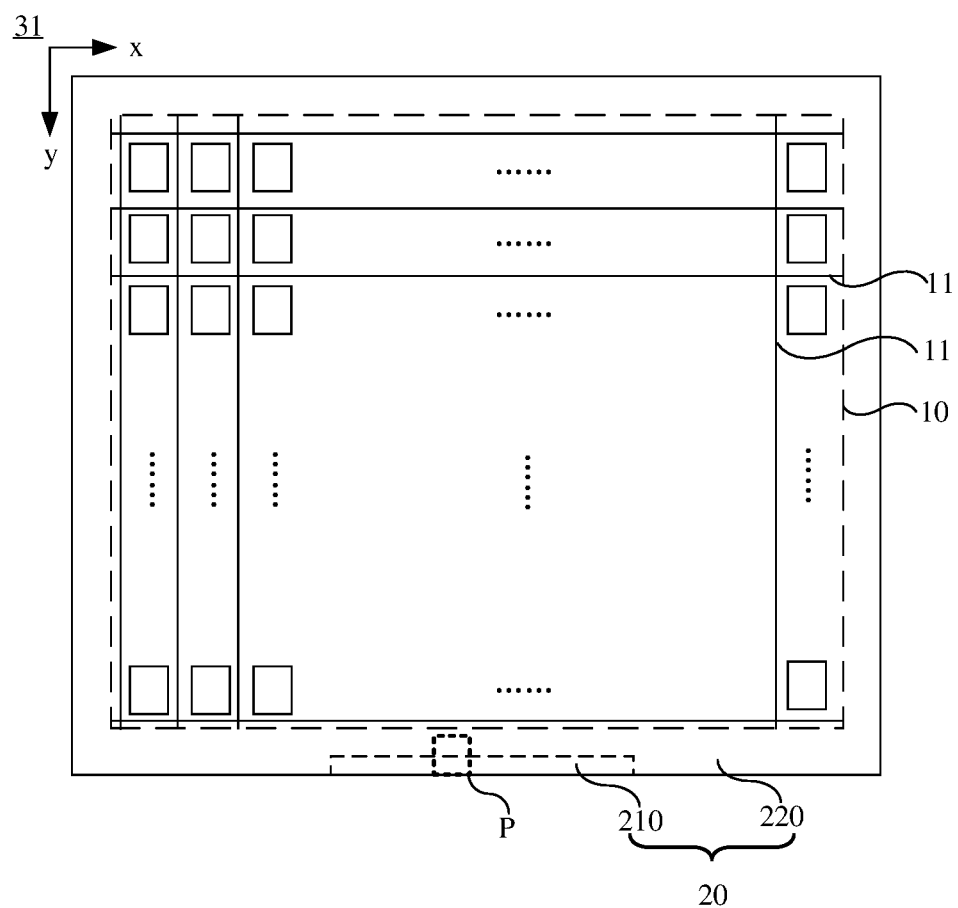
FIG. 2 is a schematic top view of an array substrate in FIG. 1.

Here, on the basis of FIG. 1, FIG. 2 shows a schematic top view of the array substrate 31 in FIG. 1. As shown in FIG. 2, in this schematic top view, the array substrate 31 includes a display area 10 and a peripheral area 20 surrounding the display area 10, the peripheral area 20 includes a bonding area 210 and a non-bonding area 220, the bonding area 210 is disposed on at least one side outside the display area 10, and FIG. 2 takes that the bonding area 210 is disposed at a lower side outside the display area 10 as an example for illustration.

Figure 3:
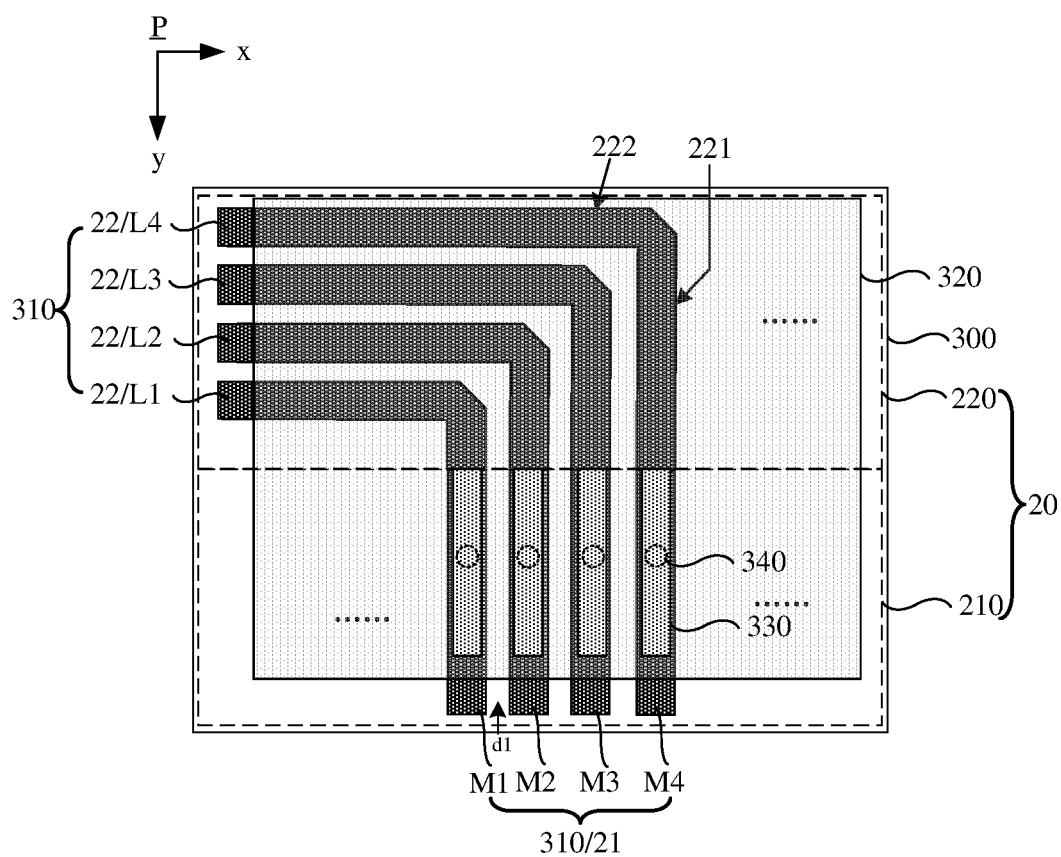
FIG. 3 is a schematic structural diagram of a P area in FIG. 2.
Figure 4:
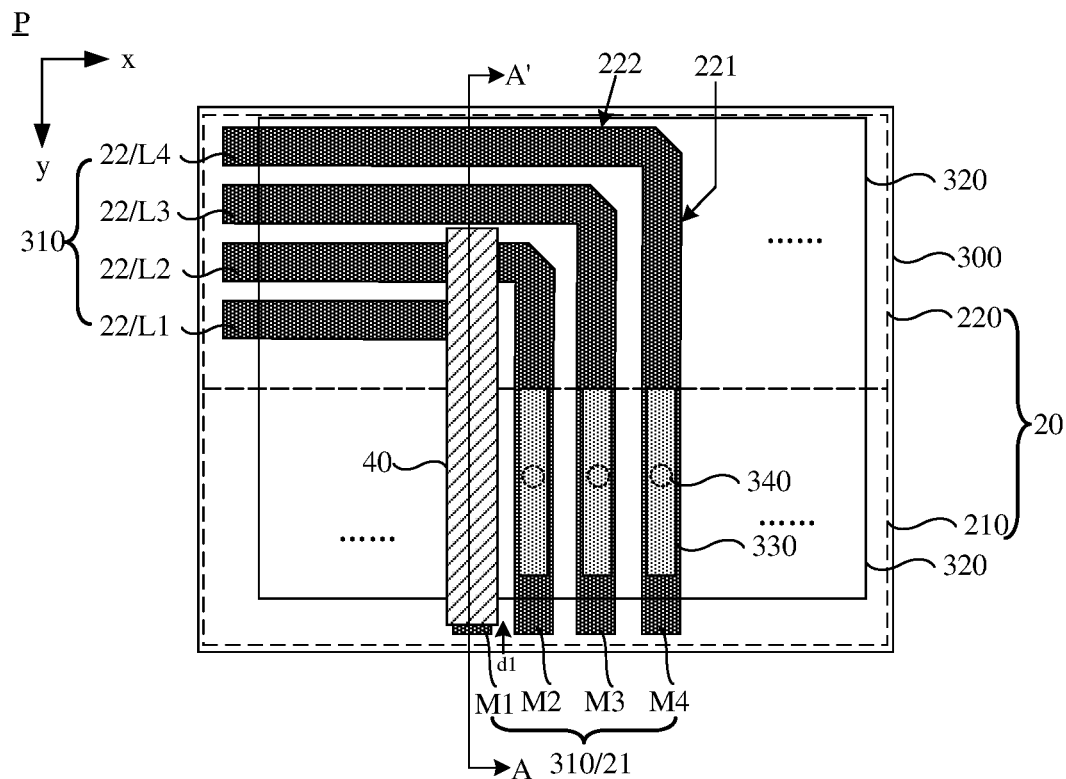
FIG. 4 is a schematic structural diagram that conductive contacts in FIG. 3 are bonded with gold fingers.
Figure 5:
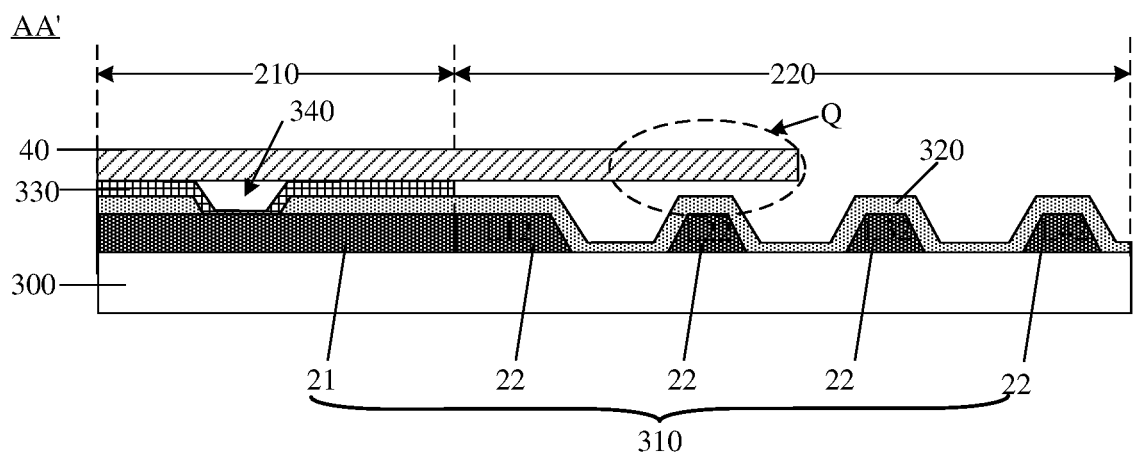
FIG. 5 is a cross-sectional schematic diagram of FIG. 4 along an AA' direction.
Figure 6:
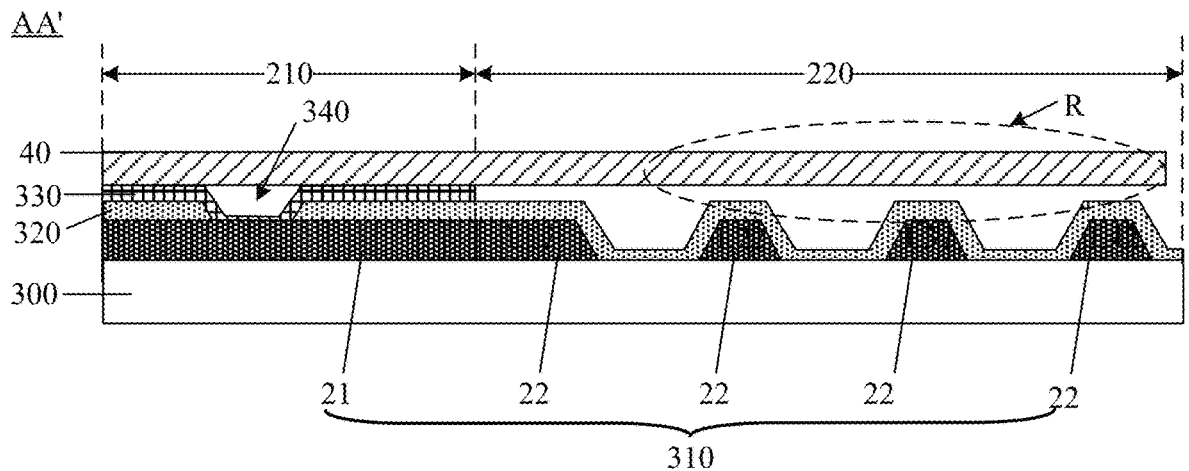
FIG. 6 is another cross-sectional schematic diagram, along the AA' direction, that the conductive contacts bonded with the gold fingers.

FIG. 3 is a schematic structural diagram of a P area in FIG. 2. FIG. 4 is a schematic structural diagram that conductive contacts in FIG. 3 are bonded with gold fingers. FIG. 5 is a cross-sectional schematic diagram of FIG. 4 along an AA' direction. FIG. 6 is another cross-sectional schematic diagram, along the AA' direction, that the conductive contacts bonded with the gold fingers.

As shown in FIG. 2 to FIG. 6, the display area 10 of the array substrate 31 is provided with a plurality of signal lines 11 configured for displaying, the bonding area 210 is provided with a plurality of conductive contacts 21 (M1, M2, M3 and M4 as shown in FIG. 3 to FIG. 6) arranged along an x direction, and the non-bonding area 220 is provided with a plurality of signal leads 22 (L1, L2, L3 and L4 as shown in FIG. 3 to FIG. 6).

It should be understood that the signal lines 11 of the display area 10 and the conductive contacts 21 of the bonding area 210 are connected through the signal leads 22 in the non-bonding area 220. The signal leads 22 are in a one-to-one correspondence with the conductive contacts 21. Based on this, the conductive contacts 21 are bonded with the gold fingers 40 of the FPC (Flexible Printed Circuit), that is, the conductive contacts 21 and the gold fingers 40 are connected in a one-to-one correspondence, so that a signal provided by the circuit board 5 may be transmitted to an inside of the display area 10 according to a sequence of the gold fingers 40, the conductive contacts 21, the signal leads 22 and the signal lines 11 to control the display screen.

Exemplarily, as shown in FIG. 3 to FIG. 6, taking four conductive contacts 21 (M1, M2, M3 and M4 as shown in FIG. 3 to FIG. 5) as an example, these four conductive contacts 21 are arranged along a first direction (such as the x direction) in order. Each of the conductive contacts 21 extends along a second direction (e.g., the y direction), and the x direction and the y direction are perpendicular to each other.

Here, one terminal of each of the conductive contacts 21 approaching to the display area 10 is connected with one signal lead 22. The signal leads 22 are used to connect with the signal lines 11 inside the display area 10. During layout, a shape of the signal leads 22 is generally bent, for example, the shape of the signal leads 22 may be an L-shaped bend, that is, each of the signal leads 22 may include a first signal lead sub-portion 221 extending along the second direction y, and a second signal lead sub-portion 222 connected to one terminal of the first signal lead sub-portion 221 and extending along the first direction x. Among the four conductive contacts 21, each of the conductive contacts 21 is configured to bond with one gold finger 40 of the FPC.

Based on the above structure, in the prior art, in order to meet design requirements of the narrow frame as much as possible, the length of the first signal lead sub-portion 221 extending along the second direction y and included in the signal lead 22 is usually compressed, and the length of the second signal lead sub-portion 222 extending along the first direction x is increased as much as possible.

However, as shown in FIG. 4 to FIG. 6, when the conductive contact 21 is bonded with the gold finger 40 of the FPC, if problems such as the limited device accuracy or alignment mark position design occur, it will lead to misalignment of the gold finger 40 and thus the gold finger 40 does not accurately cover the top of the conductive contact 21 and extends to the top of the signal lead 22 connected to other conductive contact 21, at this time, although a protection layer 320 is further provided above the signal leads 22, but the gold finger 40 is very likely to crush the protection layer 320 provided above the signal leads 22 due to the relatively large pressure during the bonding, which will cause the gold finger 40 to connect to different signal leads 22, thereby resulting in a short circuit problem, and in turn resulting in abnormal working of the array substrate.

First example, because the gold finger 40 required to originally cover the top of the conductive contact M1 only occurs misalignment, it also covers the top of the signal lead 22 connected to the adjacent conductive contact M2, at this time, if the protection layer 320 (the Q area as shown in FIG. 5) above the signal lead 22 connected to the conductive contact M2 is crushed when the gold finger 40 is bonded with the conductive contact M1, it will cause the signal lead L1 connected to the conductive contact M1 and the signal lead L2 connected to the conductive contact M2 are connected through the gold finger 40, thereby causing the short circuit problem.

Second example, because the gold finger 40 required to originally cover the top of the conductive contact M1 only occurs misalignment, it also covers the top of the signal leads 22 connected to the conductive contact M2, the conductive contact M3 and the conductive contact M4, at this time, if the protection layer 320 (the R area as shown in FIG. 5) above the conductive contact M2, the conductive contact M3 and the conductive contact M4 is crushed when the gold finger 40 is bonded with the conductive contact M1, it will cause the signal lead L2, the signal lead L3 and the signal lead L4 respectively connected to the conductive contact M2, the conductive contact M3 and the conductive contact M4 to connect to the signal lead L1 through the gold finger 40, and all the four signal leads are short-circuited, thereby resulting abnormal working of the array substrate 31.

In view of this, an embodiment of the present application provides an array substrate, through adding a second metal pattern layer that at least partially covers the signal leads in the protection layer above the signal leads, so that the second metal pattern layer can withstand a certain bonding pressure to provide protection for the signal leads when the gold finger is bonded with the conductive contacts, so that the short circuit problem caused by the bonding in the prior art can be avoided.

Figure 7:
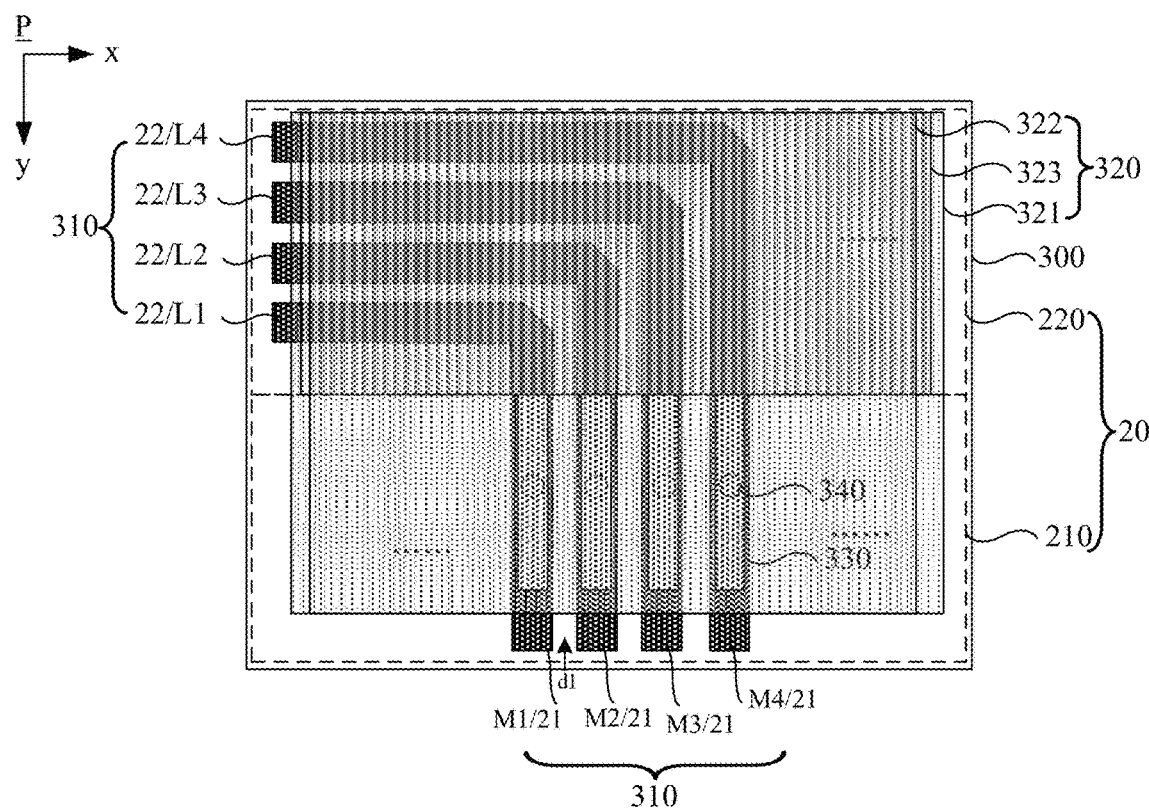
FIG. 7 is a schematic structural diagram of a P area in an array substrate provided by an embodiment of the present application.
Figure 8:
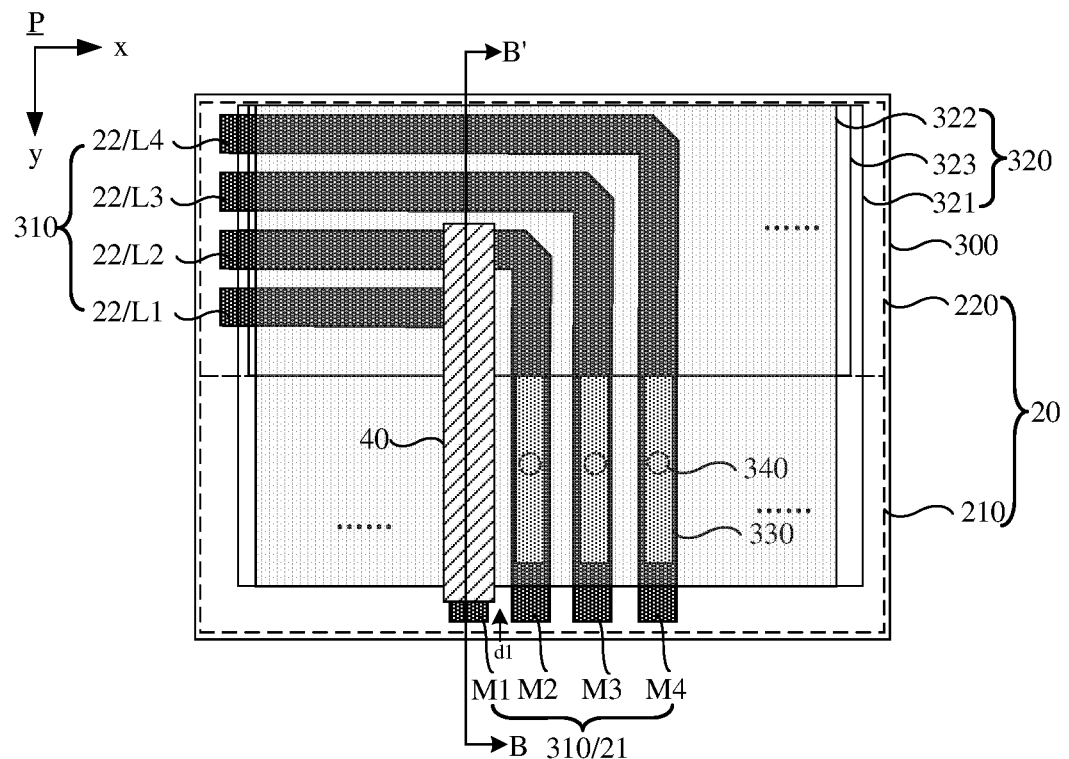
FIG. 8 is a schematic structural diagram that the conductive contacts in FIG. 7 are bonded with the gold fingers.
Figure 9:
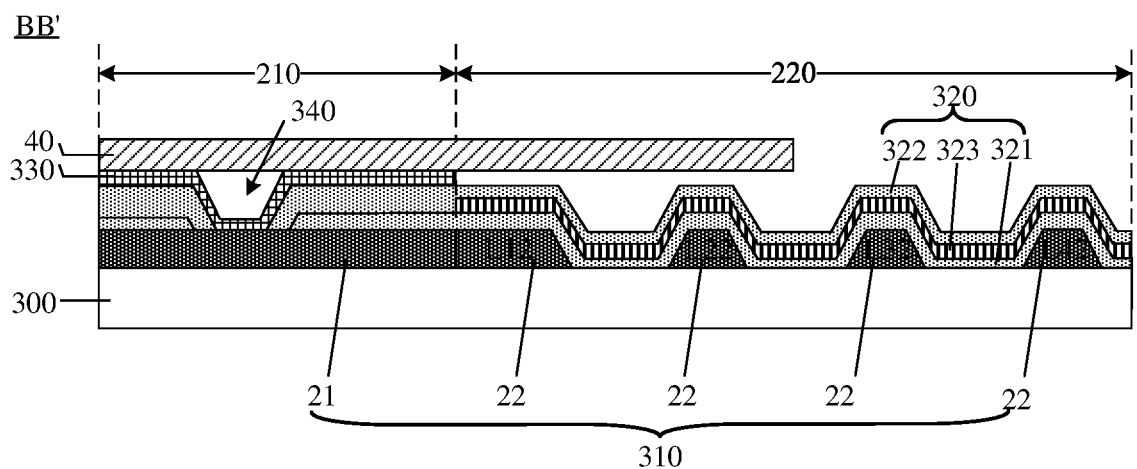
FIG. 9 is a cross-sectional schematic diagram of FIG. 8 along a BB' direction.

The structure of the array substrate provided by the embodiments of the present application will be described in detail below with reference to FIG. 2 and FIGS. 7~16. FIG. 7 is a schematic structural diagram of a P area in an array substrate provided by an embodiment of the present application. FIG. 8 is a schematic structural diagram that the conductive contacts in FIG. 7 are bonded with the gold fingers. FIG. 9 is a cross-sectional schematic diagram of FIG. 8 along a BB' direction.

As shown in FIGS. 7~9, the array substrate provided by an embodiment of the present application includes a base substrate 300, a first metal pattern layer 310 and a protection layer 320 that are stacked in sequence.

That is, the protection layer 320 is provided on one side of the base substrate 300, and the first metal pattern layer 310 is provided between the base substrate 310 and the protection layer 320.

It should be understood that the protection layer 320 may include a multi-layer structure, and the embodiments of the present application do not impose any limitation on the number of layers of the protection layer 30 and positions of the layers.

Referring to FIG. 2, the array substrate 31 further includes: a display area 10 and a peripheral area 20 surrounding the display area 10, the peripheral area 20 includes a bonding area 210 and a non-bonding area 220, and the bonding area 210 is disposed on at least one side outside the display area 10.

[2] It should be understood that the display area 10 refers to an area where the array substrate 31 can display images, and may be arranged in a central area of the array substrate 31, and the embodiments of the present application take the display area 10 that is arranged in the center of the array substrate 31 and has a rectangular shape as an example. The peripheral area 20 refers to an area where images cannot be displayed, and is arranged around the display area 10, and the embodiments of the present application take the peripheral area 20 having the same width around the display area 10 as an example. The peripheral area 20 is configured for arranging circuit traces and other electronic driving components.

It should be understood that the bonding area 210 refers to an area where the array substrate 31 is configured for connection of the gold fingers 40 of the FPC, and is usually disposed on a side outside the display area 10, and the embodiments of the present application take the bonding area 210 disposed on a lower side of the display area 10 as an example. The non-bonding area 220 refers to all remaining areas in the peripheral area 20 except the bonding area 210.

The first metal pattern layer 310 includes a plurality of conductive contacts 21 disposed in the bonding area 210 and spaced along the first direction and a plurality of bent signal leads 22 disposed in the non-bonding area 220, and one terminal of each of the conductive contacts 21 approaching to the display area 10 is connected to one corresponding signal lead 22.

Among them, the conductive contacts 21 extend along the second direction and are configured for bonding with the gold fingers 40 on the circuit board to be bonded, the first direction is parallel to an edge of the display area 10 closest to the bonding area 210, and the second direction and the first direction are perpendicular to each other.

It should be understood that, with reference to FIGS. 7~9, that the display area 10 and the bonding area 210 are both rectangles and the bonding area 210 is disposed on the lower side of the display area 10 is taken as an example, the first direction is parallel to the edge of the display area 10 closest to the bonding area 210, which refers to an edge located below the display area 10 and approaching the bonding area 210, that is, the first direction is the x direction. The second direction and the first direction are perpendicular to each other, and the second direction is the y direction.

Thus, the first metal pattern layer 310 includes the plurality of conductive contacts 21 disposed in the bonding area 210 and spaced along the x direction, each of the conductive contacts 21 extends along the y direction, and one terminal (the upper terminal) of each of the conductive contacts 21 approaching the display area 10 is connected to the corresponding signal lead 22. Here, the conductive contacts 21 and the signal leads 22 are in one-to-one correspondence, so that the signal leads 22 are connected to the signal lines of the display area 10, in this way a signal may be transmitted from outside to the display area 10 through bonding the conductive contacts 21 with the gold fingers 40 of the circuit board, so as to control the display screen. Here, the circuit board to be bonded may be an FPC.

It should be understood that a size of the bonding area 210, a size of the conductive contacts 21, and distance between adjacent conductive contacts 21 may be set according to needs, which are not limited in the embodiments of the present application.

It should be understood that, since there is a certain interval between the conductive contacts 21, correspondingly, there is also a certain interval between the signal leads 22 connected to the conductive contacts 21, and the cross-sectional width of each of the conductive contacts 21 may be or may be not the same as that of each of the signal leads 22, therefore, the interval between the conductive contacts 21 may be the same or different with the interval between the signal leads 22. Additionally, a routing direction of the bent signal leads 22 may be set according to needs, which is not limited in the embodiments of the present application.

It should be understood that the first metal pattern layer 310 and a gate electrode in a TFT (Thin Film Transistor)

disposed in the display area 10 may use the same material and may be prepared in the same layer.

The protection layer 320 includes a first insulation layer 321 and a second metal pattern layer 323 that are stacked, along the thickness direction of the base substrate 300, the first insulation layer 321 is disposed on a side of the second metal pattern layer 323 approaching the base substrate, here the second metal pattern layer 323 is disposed in the non-bonding area 220, and the second metal pattern layer 323 at least partially covers the signal leads 22.

It should be understood that the protection layer 320 may be laid, in a form of a whole layer, on a side of the first metal pattern layer 310 facing away from the base substrate 300 and on an area of the base substrate 300 where the first metal pattern layer 310 is not laid, here, since the first metal pattern layer 310 has a certain shape, the protection layer 320 laid on the first metal pattern layer 310 will vary with the shape of the first metal pattern layer 310. For example, part of the protection layer 320 is laid over the conductive contacts 21, part of the protection layer 320 is laid at space between the conductive contacts 21, part of the protection layer 320 is laid over the signal leads 22, and part of the protection layer 320 is laid on space between the signal leads 22.

Alternatively, the protection layer 320 may also be laid on a side of the first metal pattern layer 310 facing away from the base substrate 300, or the protection layer 320 may be laid only in the non-bonding area 220, which is not limited by the embodiments of the present application. The protection layer 320 is configured to protect the conductive contacts 21 and the signal leads 22.

It should be understood that, since the protection layer 320 includes the first insulation layer 321 and the second metal pattern layer 323 which are arranged as stacked, thus a film layer structure from bottom to top along the thickness direction of the array substrate 31 is successively as follows: the base substrate 300, the first metal pattern layer 310, the first insulation layer 321 and the second metal pattern layer 323.

Since the protection layer 320 includes the first insulation layer 321, and the first insulation layer 321 is disposed between the first metal pattern layer 310 and the second metal pattern layer 323, therefore the second metal pattern layer 323 disposed in the non-bonding area 220 is not adjacent to the signal leads 22 included in the first metal pattern layer 310. Of course, the protection layer 320 may further include other layers on the side of the first insulation layer 321 approaching the second metal pattern layer 323 or the side approaching the first metal pattern layer 310, which may be set according to needs and not limited by the embodiments of the present application.

It should be understood that, that the so-called second metal pattern layer 323 at least partially covers the signal leads 22 means that: the second metal pattern layer 323 disposed in the non-bonding area 220 may be laid in a form of a whole layer, or may be laid only on the corresponding top of the signal leads 22, that is, projection of the second metal pattern layer 323 on the base substrate 300 coincides with projection of the signal leads 22 on the base substrate 300, and the second metal pattern layer 323 may also be partially laid on the signal leads 22.

Here, a laying area of the second metal pattern layer 323 may be specifically set according to needs, which is not limited by the embodiments of the present application.

It should be understood that the second metal pattern layer 323 and a source electrode and a drain electrode of the TFT provided in the display area 10 may be prepared by using the same material and disposed in the same layer.

It could be understood that, since one layer of the second metal pattern layer 323 is added in the protection layer 320, not only it can provide protection for the signal leads 22 and reduce the possibility of the short circuit problem when the gold fingers 40 are bonded, but also there is no need to compress the layout design space of the signal leads 22 in the non-bonding area 220 because the second metal pattern layer 323 is added above the signal leads 22. Additionally, the second metal pattern layer 323 can also be prepared in the same layer as the source electrode and the drain electrode in the TFT, so that no additional production cost is required.

An embodiment of the present application provides an array substrate, which makes the second metal pattern layer capable of withstanding a certain bonding pressure and providing protection for the signal leads when the gold fingers are bonded with the conductive contacts through adding the second metal pattern layer in the protection layer disposed above the bent signal leads, so as to avoid the short circuit problem caused by the bonding in the prior art.

Optionally, as a possible implementation, as shown in FIGS. 7~9, along the thickness direction of the base substrate 300, a side of the protection layer 320 facing away from the base substrate 300 is further provided with a third metal pattern layer 330 disposed in the bonding area 210.

The third metal pattern layer 330 is connected to the conductive contacts 21 through through-holes 340 disposed in the protection layer 320, and the third metal pattern layer 330 is configured to connect the conductive contacts 21 and the gold fingers 40 when the conductive contacts 21 are bonded with the gold fingers 40.

It should be understood that the protection layer 320 is usually laid in a form of a whole layer, the through-holes 340 are required to be provided in the protection layer 320 above the conductive contacts 21 and then the third metal pattern layer 330 is laid in order to bond the conductive contacts 21 with the gold fingers 40 of the circuit board to be bound, and the third metal pattern layer 330 is used as an intermediate medium to connect the conductive contacts 21 with the gold fingers 40. The number, shape, and specific positions of the through-holes 340 are not limited by the embodiments of the present application.

It should be understood that the third metal pattern layer 330 and the pixel electrodes disposed in the display area 10 may be prepared by using the same material and in the same layer.

It should also be understood that the third metal pattern layer 330 disposed in the bonding area 210 is not in contact with the second metal pattern layer 323 disposed in the non-bonding area 220.

Optionally, as a possible implementation, the protection layer 320 further includes: a second insulation layer 322.

Along the thickness direction of the base substrate 300, the second metal pattern layer 323 is disposed between the first insulation layer 321 and the second insulation layer 322.

For example, as shown in FIGS. 7~9, along the thickness direction of the base substrate 300, the base substrate 300, the first insulation layer 321, the second metal pattern layer 323 and the second insulation layer 322 are sequentially arranged from bottom to top; additionally, the first insulation layer 321 and the second insulation layer 322 may also be exchanged, in this case, the base substrate 300, the second insulation layer 322, the second metal pattern layer 323 and the first insulation layer 321 are sequentially arranged from bottom to top.

Here, the first insulation layer 321 and the second insulation layer 322 are both laid in a form of a whole layer.

It should be understood that, that the first insulation layer 321 is disposed under the second metal pattern layer 323 and the second insulation layer 322 is disposed above the second metal pattern layer 323 is taken as an embodiment, the first insulation layer 321 and a source layer of the TFT provided in the display area 10 may be prepared in the same layer, and the second insulation layer 322 and an insulation layer laid in the display area 10 may be prepared in the same layer. Based on this structure, when one pair of gold finger 40 and conductive contact 21 are bonded, even if the gold finger 40 crushes the second insulation layer 322 above the signal leads 22, the gold finger 40 will only connect to the second metal pattern layer 323, and short-circuiting of the signal leads 22 and other signal leads 22 can still be avoided.

Optionally, as a possible implementation, the protection layer 320 further includes: a second insulation layer 322;

Along the thickness direction of the base substrate 300, the second insulation layer 322 is disposed between the first insulation layer 321 and the second metal pattern layer 323.

For example, along the thickness direction of the base substrate 300, the base substrate 300, the first insulation layer 321, the second insulation layer 322 and the second metal pattern layer 323 are arranged sequentially from bottom to top; furthermore, the first insulation layer 321 and the second insulation layer 322 may also be exchanged, in this case the base substrate 300, the second insulation layer 322, the first insulation layer 321 and the second metal pattern layer 323 are arranged sequentially from bottom to top.

Figure 10:
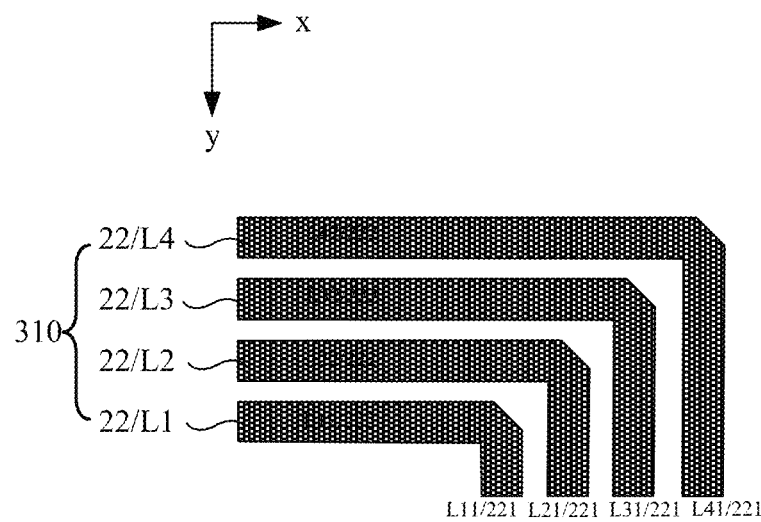
FIG. 10 is a schematic structural diagram of a signal lead 22.

Optionally, as a possible implementation, FIG. 10 shows a schematic structural diagram of the signal lead 22. The signal lead 22 includes a first signal lead sub-portion 221 extending along the second direction and a second signal lead sub-portion 222 extending along the first direction, a first terminal of the first signal lead sub-portion 221 is connected to the conductive contact 21, and a second terminal of the first signal lead sub-portion 221 is connected to one terminal of the second signal lead sub-portion 222.

As shown in FIG. 10, for example, the signal lead L1 includes the first signal lead sub-portion L11 extending in the second direction y and the second signal lead sub-portion L12 extending in the first direction x, the first terminal (the lower terminal) of the first signal lead sub-portion L11 is connected to the conductive contact 21, and the second terminal (such as the upper terminal) of the first signal lead sub-portion L11 is connected to one terminal of the second signal lead sub-section L12, in this way, the formed signal lead L1 has an L-bend shape.

Similarly, the other signal leads 22 also have an L-bend shape.

Based on this, the second metal pattern layer 323 includes a plurality of metal protection lines 3230, and the metal protection lines 3230 are disposed on a side of the signal leads facing away from the base substrate 300.

It should be understood that the second metal pattern layer 323 added in the protection layer 320 may include the plurality of metal protection lines 3230, and the metal protection lines 3230 are disposed on the side of the signal leads 22 facing away from the base substrate 300, which can prevent mutual short-circuiting between the signal leads 22. That is to say, the metal protection lines 3230 are in one-to-one correspondence with the signal leads 22, and the metal protection lines 3230 play a protective role for the corresponding signal leads 22. In this way, compared to laying one whole layer of the second metal pattern layer 323 in the non-bonding area 220, some materials can be saved.

Figure 11:
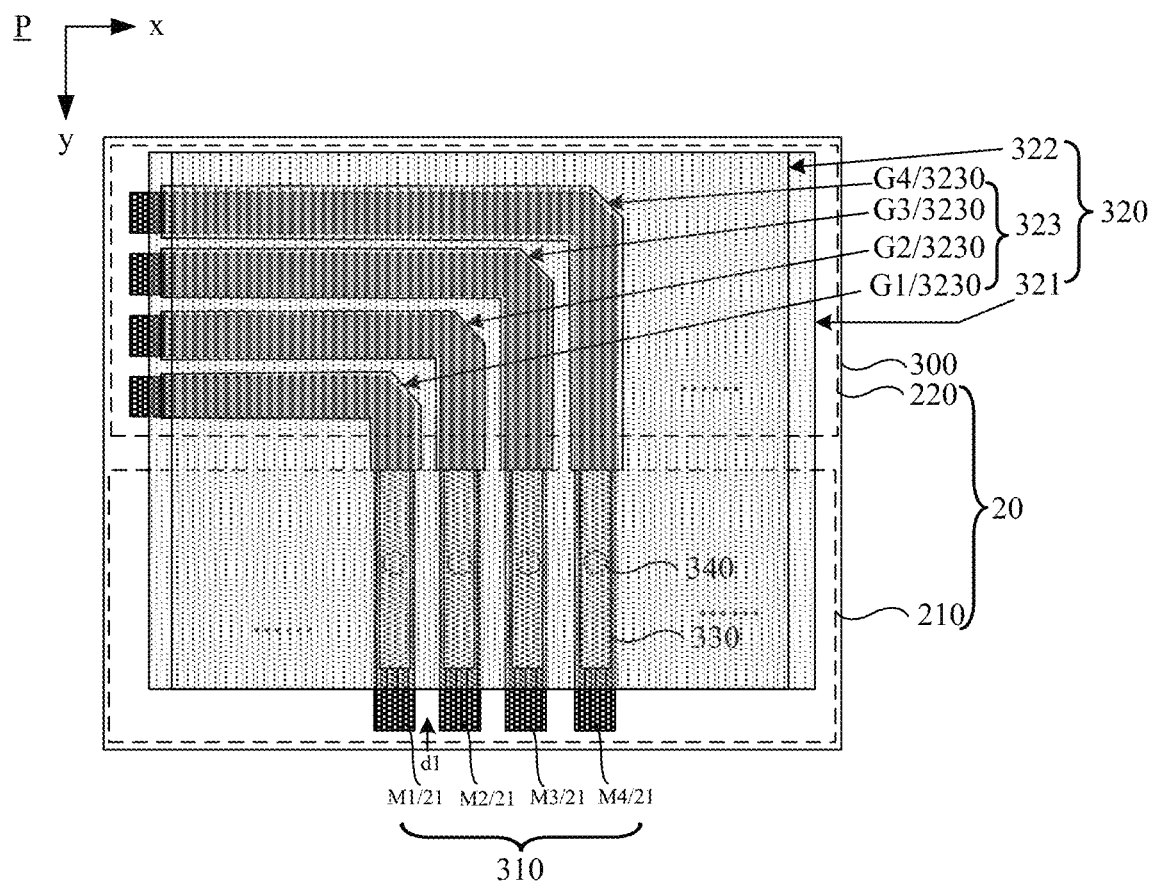
FIG. 11 is a schematic structural diagram of a P area in another array substrate provided by an embodiment of the present application.
Figure 12:
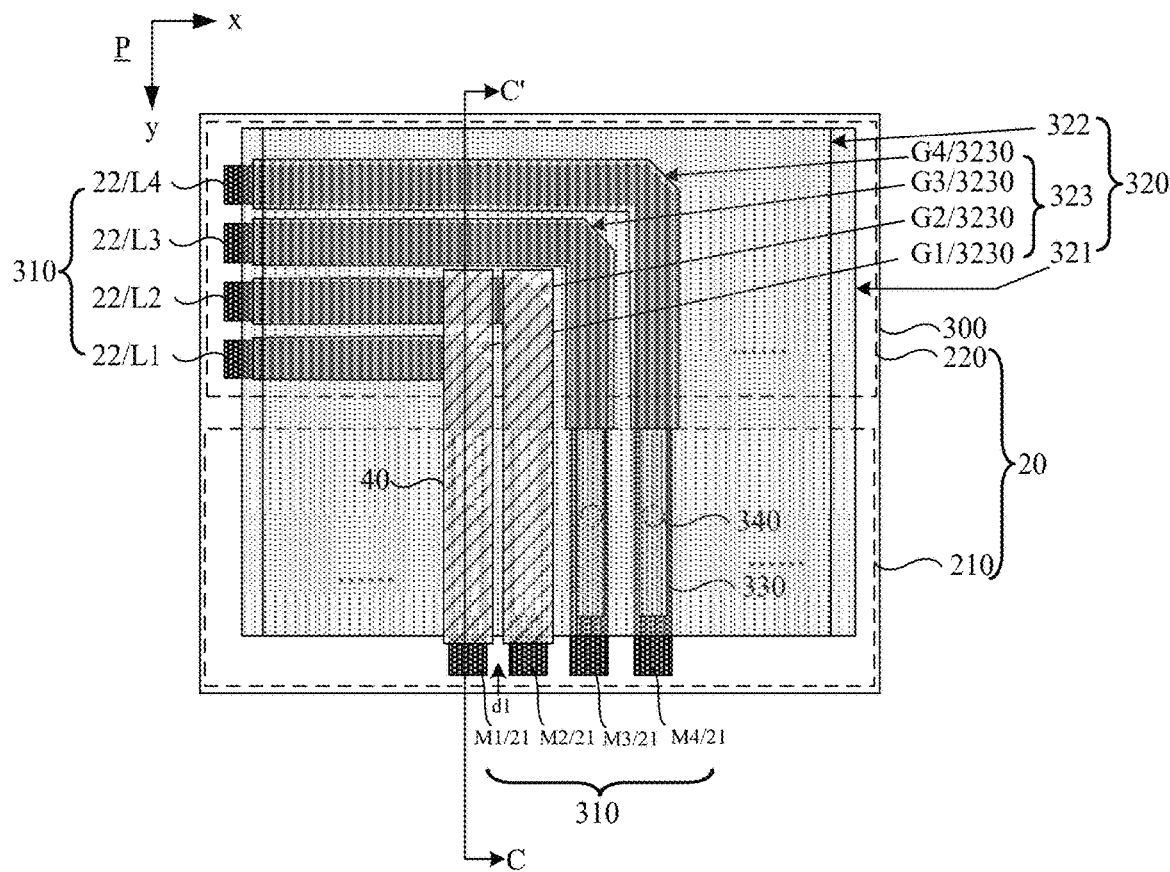
FIG. 12 is a schematic structural diagram that the conductive contacts in FIG. 11 are bonded with the gold fingers.
Figure 13:
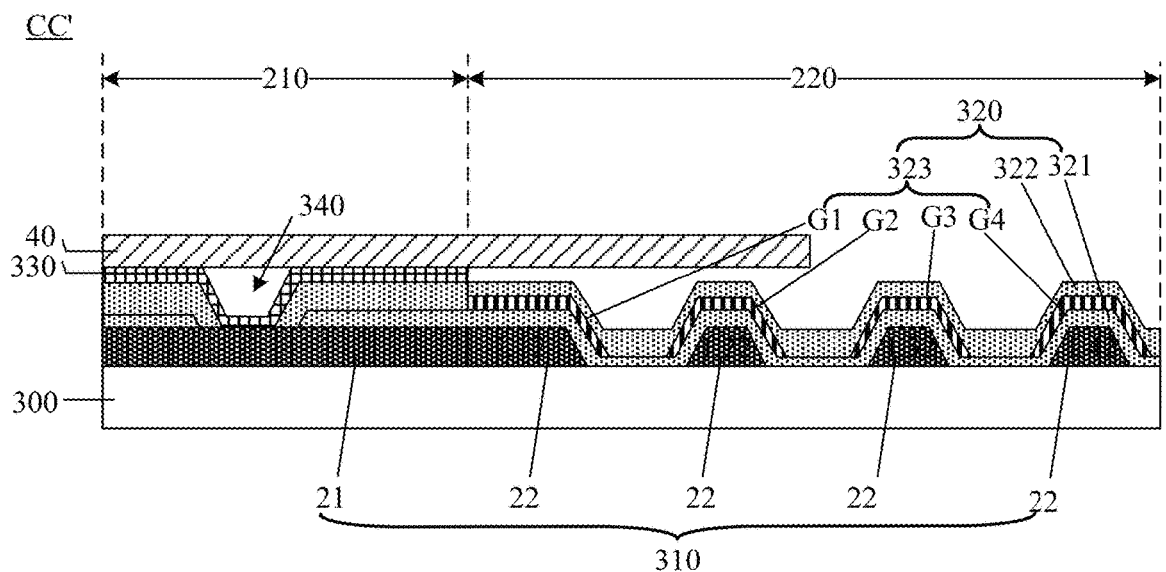
FIG. 13 is a cross-sectional schematic diagram of FIG. 12 along a CC' direction.

Optionally, as a possible implementation, FIG. 11 is a schematic structural diagram of a P area in another array substrate 31 provided by an embodiment of the present application, and FIG. 12 is a schematic structural diagram that the conductive contacts in FIG. 11 are bonded with the gold fingers. FIG. 13 is a schematic cross-sectional view of FIG. 12 along a CC' direction.

FIGS. 11~13 are taken as an example, projection of the metal protection lines 3230 on the base substrate 300 coincides with projection of the signal leads 22 on the base substrate.

It should be understood that if the signal leads 22 are bent in an L shape, the metal protection lines 3230 on the side of the signal leads 22 facing away from the base substrate are also bent in an L shape. For example, the metal protection lines 3230 are G1, G2, G3 and G4 as shown in FIGS. 11~13. The metal protection lines G1, G2, G3 and G4 have a one-to-one correspondence with the signal leads L1, L2, L3 and L4 respectively.

Alternatively, a cross section of the signal lead 22 may be rectangular or trapezoidal.

Optionally, the cross-sectional width of the metal protection line 3230 is equal to the cross-sectional width of the signal lead 22.

It should be understood that when the cross-section of the signal lead 22 is rectangular, the cross-sectional width of the metal protection line 3230 may correspond to the cross-sectional width of the signal lead 22 (the length of the edge parallel to the base substrate 300), that is, the cross-sectional width of the metal protection line 3230 is equal to the cross-sectional width of the signal lead 22; when the cross-section of the signal lead 22 is trapezoidal, the cross-sectional width of the metal protection line 3230 may correspond to the cross-sectional width of the signal lead 22 (the length of the bottom edge parallel to the base substrate 300), that is, the cross-sectional width of the metal protection line 3230 is equal to the cross-sectional width of the signal lead 22.

Figure 14:
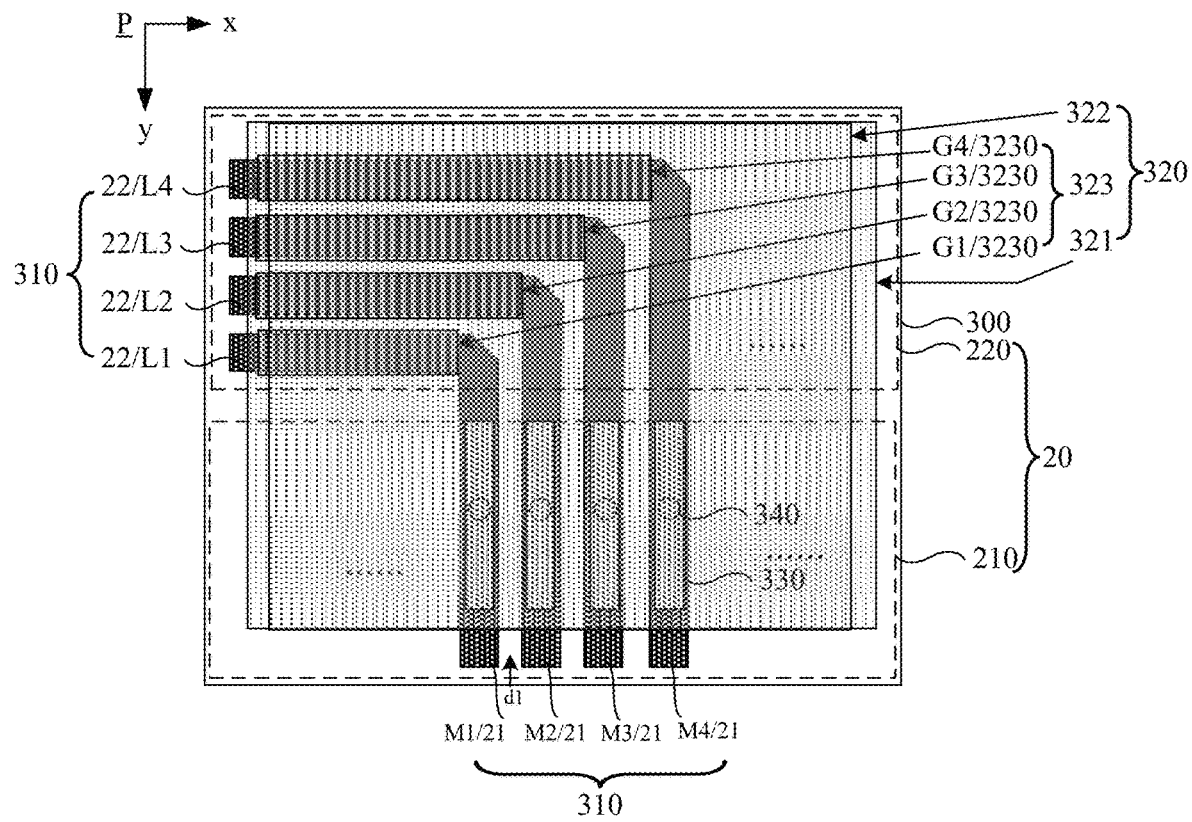
FIG. 14 is a schematic structural diagram of a P area in yet another array substrate provided by an embodiment of the present application.

Optionally, as another possible implementation, FIG. 14 is a schematic structural diagram of a P area in yet another array substrate 31 provided in an embodiment of the present application. As shown in FIG. 14, the projection of the metal protection lines 3230 on the base substrate 300 coincides with the projection of the second signal lead sub-portions 222 on the base substrate 300.

It should be understood that since a deviation direction is the second direction when the gold fingers 40 are bonded, therefore the metal protection lines 3230 may be provided only above the second signal lead sub-portions 222 in order to save materials, so as to play a role of protecting the second signal lead sub-portions 222.

Figure 15:
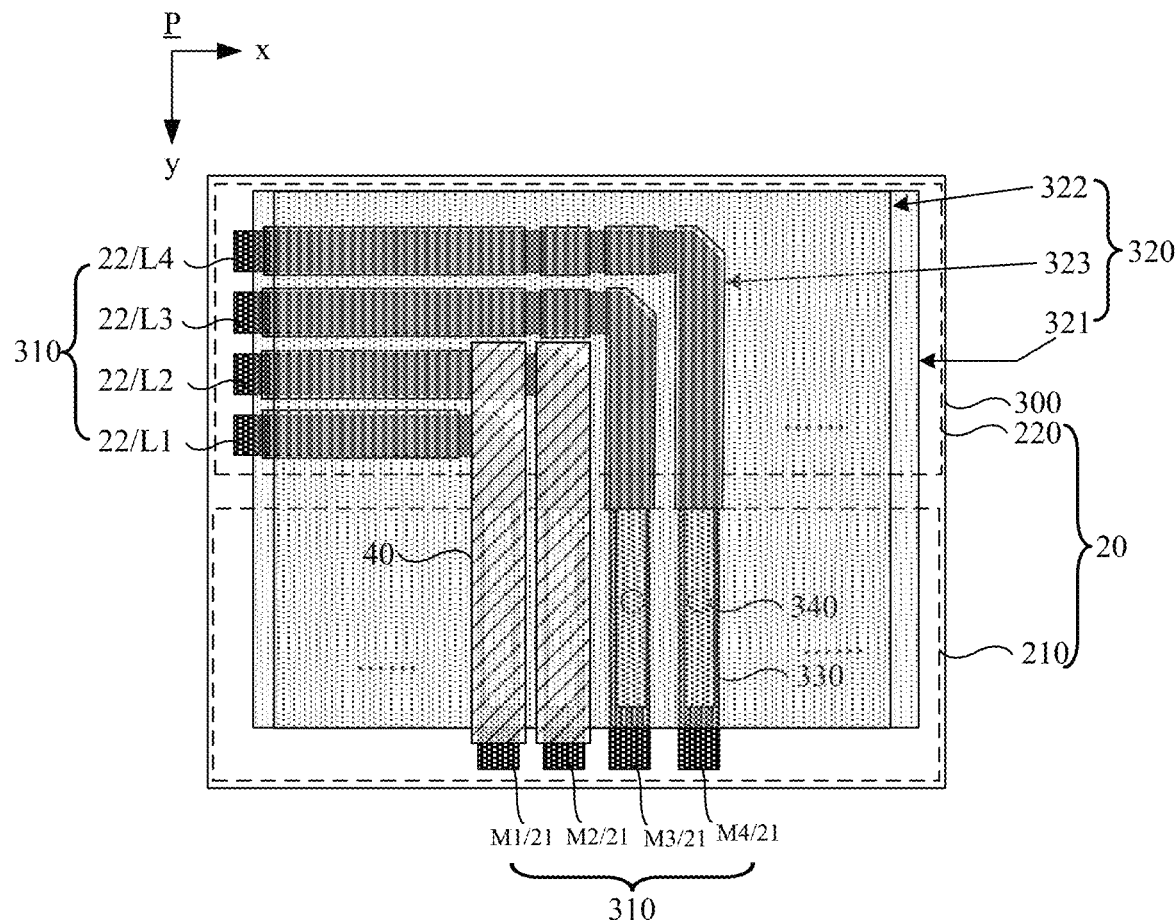
FIG. 15 is a schematic structural diagram of a P area in yet another array substrate provided by an embodiment of the present application.
Figure 16:
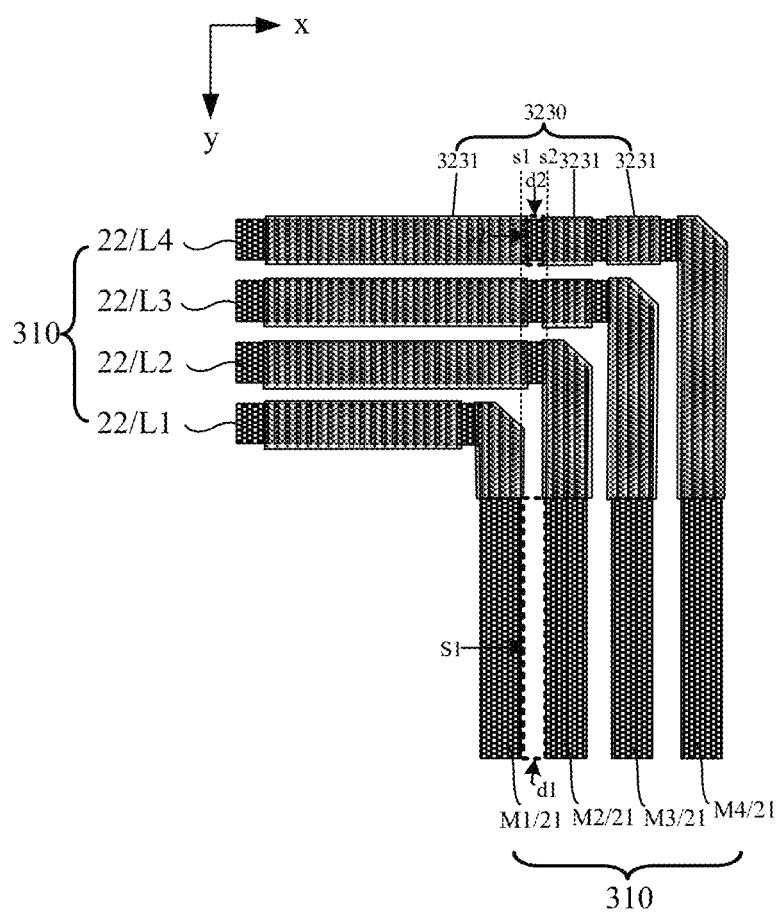
FIG. 16 is a schematic structural diagram of a first metal pattern layer and a second metal pattern layer in FIG. 15.

Optionally, as another possible implementation, FIG. 15 is a schematic structural diagram of a P area in yet another array substrate provided by an embodiment of the present application. FIG. 16 is a schematic structural diagram of the first metal pattern layer and the second metal pattern layer in FIG. 15.

As shown in FIG. 15 and FIG. 16, the metal protection line 3230 disposed on a side of the second signal lead sub-portion 222 facing away from the base substrate 300 includes a plurality of sub-metal protection lines 3231.

It should be understood that the number of the sub-metal protection lines 3231 included in each metal protection line 3230 and the length of each sub-metal protection line 3231 may be set according to needs, which is not limited by the embodiments of the present application.

Along the first direction, length of a second interval region between adjacent sub-metal protection lines 3231 is less than or equal to length of a first interval region between adjacent two of the conductive contacts.

Here, the second interval region corresponding to different second signal lead sub-portions 222 is disposed between extension lines of two edges of the first interval region that are parallel to the second direction.

For example, along the first direction x, the length of the second interval region S2 (d2 as shown in FIG. 16) between adjacent sub-metal protection lines 3231 is less than or equal to the length of the first interval region S1 (d1 as shown in FIG. 16) between the two connected conductive contacts 21.

On this basis, for example, regarding the first interval region S1 located between the conductive contact M1 and the conductive contact M2, the extension lines of its two edges parallel to the second direction y are respectively s1 and s2, thus there are a plurality of second interval regions distributed between the extension lines s1 and s2, and each of the second interval regions corresponds to one second signal lead sub-portion 222.

Similarly, regarding the first interval regions between other adjacent two of the conductive contacts, there are also second interval regions distributed between the extension lines of the two edges parallel to the second direction, and each of the second interval regions corresponds to one second signal lead sub-portion 222.

It should be understood that on the basis of FIGS. 11~13, after the plurality of gold fingers 40 are respectively bonded with the corresponding conductive contacts 21, when the plurality of gold fingers 40 all crush the first insulation layer on the signal leads 22, at this time the signal leads 22 will be connected through different gold fingers 40 if the plurality of gold fingers 40 crush the first insulation layer 321 on the same signal lead 22, thereby resulting in a short-circuiting problem. Therefore, after the metal protection line 3230 is arranged as a structure of multiple sub-metal protection lines 3231, even if the plurality of gold fingers 40 all crush the first insulation layer 321 on the same signal lead 22, the short-circuiting problem can be avoided since there are gaps between the sub-metal protection lines 3231.

Exemplarily, as shown in FIG. 12, when both the first gold finger 40 and the second gold finger 40 arranged in the first direction crush the first insulation layer 321 on the signal lead L2, at this time the first gold finger 40 and the second gold finger 40 are possible to be connected through the signal lead L2, which in turn leads to the connection of the signal lead L1 and the signal lead L2. Therefore, as shown in FIG. 15, when there is the second interval region between the sub-metal protection lines 3231 laid above the signal lead L2, the first gold finger 40 and the second gold finger 40 can be separated to avoid occurrence of the short-circuiting problem.

An embodiment of the present application further provides a LCD panel, which includes: an opposite substrate and the above-mentioned array substrate, and a LC layer disposed between the opposite substrate and the array substrate.

The beneficial effects of the LCD panel provided by the embodiments of the present application are the same as the beneficial effects corresponding to the array substrate, which will not be repeated herein again.

An embodiment of the present application further provides a LCD apparatus, which includes: a circuit board to be bonded and the LCD panel described above:

gold fingers are arranged on the circuit board to be bonded, the gold fingers are adapted to a shape of conductive contacts on the array substrate in the LCD panel, and the gold fingers are configured to bond with the conductive contacts.

The beneficial effects of the LCD apparatus provided by the embodiments of the present application are the same as the beneficial effects corresponding to the array substrate described above, which will not be repeated herein again.

The above described embodiments are only used to illustrate, but not to limit, the technical solutions of the present application: although the present application has been described in detail with reference to the foregoing embodiments, those of ordinary skill in the art should understand that: they can still modify the technical solutions described in the foregoing embodiments, or equivalently replace some technical features therein; and these modifications or replacements do not make the essence of the corresponding technical solutions deviate from the spirit and scope of the technical solutions in the embodiments of the present application, and should be included within the protection scope of the present application.

What is claimed is:

1. An array substrate comprising a base substrate, a first metal pattern layer and a protection layer arranged as stacked in sequence; wherein the array substrate further comprises: a display area and a peripheral area surrounding the display area, the peripheral area comprises a bonding area and a non-bonding area, and the bonding area is disposed on at least one side outside the display area;

the first metal pattern layer comprises a plurality of conductive contacts disposed in the bonding area and arranged at intervals along a first direction and a plurality of signal leads disposed in the non-bonding area and having a bent shape, one terminal of each of the conductive contacts approaching the display area is connected with corresponding one of the signal leads, the conductive contacts extend along a second direction and are configured to bond with gold fingers on a circuit board to be bonded, the first direction is parallel to an edge of the display area most approaching the bonding area, and the second direction and the first direction are perpendicular to each other;

each of the signal leads comprises a second signal lead sub-portion extending along the first direction;

the protection layer comprises a first insulation layer and a second metal pattern layer arranged as stacked in sequence, and along a thickness direction of the base substrate, the first insulation layer is disposed on a side of the second metal pattern layer approaching the base substrate, wherein the second metal pattern layer is disposed in the non-bonding area, and the second metal pattern layer at least partially covers the signal leads;

wherein, each of the metal protection lines disposed on a side of the second signal lead sub-portions facing away from the base substrate comprises a plurality of sub-metal protection lines;

along the first direction, a length of a second interval region between adjacent two of the sub-metal protection lines is less than or equal to a length of a first internal region between adjacent two of the conductive contacts; and wherein, the second interval region corresponding to different second signal lead sub-portions is located between extension lines of two edges of the first interval region parallel to the second direction;

wherein there are a plurality of second interval regions distributed between the extension lines of two edges, and each of the second interval regions corresponds to one second signal lead sub-portion;

wherein, along the thickness direction of the base substrate, a third metal pattern layer disposed in the bonding area is further provided on a side of the protection layer facing away from the base substrate; the third metal pattern layer is connected to the conductive contacts through through-holes provided in the protection layer, and the third metal pattern layer is configured to connect the conductive contacts with the gold fingers when the conductive contacts are bonded with the gold fingers; and wherein the third metal pattern layer located in the bonding area is not in contact with the second metal pattern located in the non-bonding area.

2. The array substrate of claim 1, wherein, each of the signal leads-comprises a first signal lead sub-portion extending along the second direction, a first terminal of the first signal lead sub-portion is connected to corresponding one of the conductive contacts, and a second terminal of the first signal lead sub-portion is connected to one terminal of the second signal lead sub-portion; and the second metal pattern layer comprises a plurality of metal protection lines, and the metal protection lines are disposed on a side of the signal leads facing away from the base substrate.

3. The array substrate of claim 2, wherein projection of the metal protection lines on the base substrate coincides with projection of the signal leads on the base substrate.

4. The array substrate of claim 2, wherein projection of the metal protection lines on the base substrate coincides with projection of the second signal lead sub-portions on the base substrate.

5. The array substrate of claim 1, wherein the protection layer further comprises: a second insulation layer;

along the thickness direction of the base substrate, the second metal pattern layer is disposed between the first insulation layer and the second insulation layer.

6. The array substrate of claim 1, wherein, the protection layer further comprises: a second insulation layer;

along the thickness direction of the base substrate, the second insulation layer is disposed between the first insulation layer and the second metal pattern layer.

7. The array substrate of claim 1, wherein the first metal pattern layer and a gate electrode of a TFT included in the display area are made of the same material and prepared in the same layer.

8. The array substrate of claim 1, wherein the second metal pattern layer and a source electrode and a drain electrode of a TFT included in the display area are made of the same material and prepared in the same layer.

9. The array substrate of claim 1, wherein the third metal pattern layer and a pixel electrode included in the display area are made of the same material and prepared in the same layer.

10. The array substrate of claim 1, wherein a cross section of each of the signal leads is rectangular or trapezoidal.

11. The array substrate of claim 10 wherein, the cross-sectional width of each of the metal protection lines is equal to the cross-sectional width of each of the signal leads.

12. An LCD panel, comprising: an opposite substrate and an array substrate, and an LC layer disposed between the opposite substrate and the array substrate; wherein the array substrate comprises: a base substrate, a first metal pattern layer and a protection layer arranged as stacked in sequence; wherein the array substrate further comprises: a display area and a peripheral area surrounding the display area, the peripheral area comprises a bonding area and a non-bonding area, and the bonding area is disposed on at least one side outside the display area;

the first metal pattern layer comprises a plurality of conductive contacts disposed in the bonding area and arranged at intervals along a first direction and a plurality of signal leads disposed in the non-bonding area and having a bent shape, one terminal of each of the conductive contacts approaching the display area is connected with corresponding one of the signal leads, the conductive contacts extend along a second direction and are configured to bond with gold fingers on a circuit board to be bonded, the first direction is parallel to an edge of the display area most approaching the bonding area, and the second direction and the first direction are perpendicular to each other;

each of the signal leads comprises a second signal lead sub-portion extending along the first direction;

the protection layer comprises a first insulation layer and a second metal pattern layer arranged as stacked in sequence, and along a thickness direction of the base substrate, the first insulation layer is disposed on a side of the second metal pattern layer approaching the base substrate, wherein the second metal pattern layer is disposed in the non-bonding area, and the second metal pattern layer at least partially covers the signal leads;

wherein, each of the metal protection lines disposed on a side of the second signal lead sub-portions facing away from the base substrate comprises a plurality of sub-metal protection lines; and along the first direction, a length of a second interval region between adjacent two of the sub-metal protection lines is less than or equal to a length of a first internal region between adjacent two of the conductive contacts;

wherein, the second interval region corresponding to different second signal lead sub-portions is located between extension lines of two edges of the first interval region parallel to the second direction;

wherein there are a plurality of second interval regions distributed between the extension lines of two edges, and each of the second interval regions corresponds to one second signal lead sub-portion;

wherein, along the thickness direction of the base substrate, a third metal pattern layer disposed in the bonding area is further provided on a side of the protection layer facing away from the base substrate; the third metal pattern layer is connected to the conductive contacts through through-holes provided in the protection layer, and the third metal pattern layer is configured to connect the conductive contacts with the gold fingers when the conductive contacts are bonded with the gold fingers; and wherein the third metal pattern layer located in the bonding area is not in contact with the second metal pattern located in the non-bonding area.

13. An LCD apparatus, comprising: a circuit board to be bonded and a LCD panel; wherein the LCD panel comprises: an opposite substrate and an array substrate, and an LC layer disposed between the opposite substrate and the array substrate; wherein the array substrate comprises: a base substrate, a first metal pattern layer and a protection layer arranged as stacked in sequence; wherein the array substrate further comprises: a display area and a peripheral area surrounding the display area, the peripheral area comprises a bonding area and a non-bonding area, and the bonding area is disposed on at least one side outside the display area;

the first metal pattern layer comprises a plurality of conductive contacts disposed in the bonding area and arranged at intervals along a first direction and a plurality of signal leads disposed in the non-bonding area and having a bent shape, one terminal of each of the conductive contacts approaching the display area is connected with corresponding one of the signal leads, the conductive contacts extend along a second direction and are configured to bond with gold fingers on a circuit board to be bonded, the first direction is parallel to an edge of the display area most approaching the bonding area, and the second direction and the first direction are perpendicular to each other;

each of the signal leads comprises a second signal lead sub-portion extending along the first direction; and the protection layer comprises a first insulation layer and a second metal pattern layer arranged as stacked in sequence, and along a thickness direction of the base substrate, the first insulation layer is disposed on a side of the second metal pattern layer approaching the base substrate, wherein the second metal pattern layer is disposed in the non-bonding area, and the second metal pattern layer at least partially covers the signal leads;

wherein, each of the metal protection lines disposed on a side of the second signal lead sub-portions facing away from the base substrate comprises a plurality of sub-metal protection lines;

along the first direction, a length of a second interval region between adjacent two of the sub-metal protection lines is less than or equal to a length of a first internal region between adjacent two of the conductive contacts;

wherein, the second interval region corresponding to different second signal lead sub-portions is located between extension lines of two edges of the first interval region parallel to the second direction;

wherein there are a plurality of second interval regions distributed between the extension lines of two edges, and each of the second interval regions corresponds to one second signal lead sub-portion;

wherein, along the thickness direction of the base substrate, a third metal pattern layer disposed in the bonding area is further provided on a side of the protection layer facing away from the base substrate; the third metal pattern layer is connected to the conductive contacts through through-holes provided in the protection layer, and the third metal pattern layer is configured to connect the conductive contacts with the gold fingers when the conductive contacts are bonded with the gold fingers;

wherein the third metal pattern layer located in the bonding area is not in contact with the second metal pattern located in the non-bonding area; and wherein the gold fingers are arranged on the circuit board to be bonded, the gold fingers are adapted to a shape of the conductive contacts disposed on the array substrate in the LCD panel, and the gold fingers are configured to bond with the conductive contacts.

14. The LCD panel of claim 12, wherein each of the signal leads comprises a first signal lead sub-portion extending along the second direction, a first terminal of the first signal lead sub-portion is connected to corresponding one of the conductive contacts, and a second terminal of the first signal lead sub-portion is connected to one terminal of the second signal lead sub-portion;

the second metal pattern layer comprises a plurality of metal protection lines, and the metal protection lines are disposed on a side of the signal leads facing away from the base substrate.

15. The LCD panel of claim 14, wherein projection of the metal protection lines on the base substrate coincides with projection of the signal leads on the base substrate.

16. The LCD panel of claim 14, wherein projection of the metal protection lines on the base substrate coincides with projection of the second signal lead sub-portions on the base substrate.

17. The LCD panel of claim 12, wherein the protection layer further comprises: a second insulation layer;

along the thickness direction of the base substrate, the second metal pattern layer is disposed between the first insulation layer and the second insulation layer.

* * * * *